United States Patent
Cogburn, Jr.

(10) Patent No.: US 9,291,009 B1
(45) Date of Patent: Mar. 22, 2016

(54) DEVICES AND METHODS FOR MANUALLY MOVING RACKED TUBULARS

(71) Applicants: Rolling Tool, LLC, Cement, OK (US); H. Lester Wald, Mustang, OK (US)

(72) Inventor: Andrew J. Cogburn, Jr., Cement, OK (US)

(73) Assignees: Rolling Tool, LLC, Cement, OK (US); H. Lester Wald, Mustang, OK (US)

( * ) Notice: Subject to any disclaimer, the term of this patent is extended or adjusted under 35 U.S.C. 154(b) by 0 days.

(21) Appl. No.: 14/718,134

(22) Filed: May 21, 2015

Related U.S. Application Data

(63) Continuation of application No. 14/602,806, filed on Jan. 22, 2015, now Pat. No. 9,057,224.

(51) Int. Cl.
*B65G 7/12* (2006.01)
*E21B 19/00* (2006.01)

(52) U.S. Cl.
CPC .. *E21B 19/00* (2013.01); *B65G 7/12* (2013.01)

(58) Field of Classification Search
CPC .................................. B65G 7/12; E21B 19/00
USPC .............. 294/4, 15, 158; 414/745.5, 910, 911
See application file for complete search history.

(56) References Cited

U.S. PATENT DOCUMENTS

| | | | | | |
|---|---|---|---|---|---|
| 630,366 | A | * | 8/1899 | Le Van | 294/4 |
| 1,319,616 | A | * | 10/1919 | Primeau | 294/4 |
| 1,580,188 | A | * | 4/1926 | Wright et al. | 414/24 |
| 1,635,259 | A | * | 7/1927 | Critchley | 16/422 |
| 2,359,261 | A | * | 9/1944 | Taylor | 294/15 |
| 2,378,454 | A | * | 6/1945 | Werling | 294/15 |
| 2,444,353 | A | * | 6/1948 | Kimmey | 294/4 |
| 2,842,272 | A | * | 7/1958 | Folks | 414/746.5 |
| 3,436,110 | A | * | 4/1969 | Kahlor | 294/15 |
| 3,643,991 | A | * | 2/1972 | Eaton | 294/209 |
| 4,102,513 | A | * | 7/1978 | Guard | 242/423.1 |
| 4,119,210 | A | * | 10/1978 | Desourdy | 414/460 |
| 4,143,774 | A | * | 3/1979 | Poulsen | 414/746.5 |
| 4,687,244 | A | * | 8/1987 | Cullen et al. | 294/86.41 |
| 5,466,114 | A | * | 11/1995 | Swain | 414/746.5 |
| 5,749,539 | A | * | 5/1998 | Ratzel et al. | 242/598.3 |
| 6,174,125 | B1 | * | 1/2001 | Davis et al. | 414/746.5 |
| 6,270,133 | B1 | * | 8/2001 | Babcock | 294/15 |
| 7,637,546 | B2 | * | 12/2009 | Navarre, II | 294/15 |
| 7,748,418 | B2 | * | 7/2010 | Johnson | 141/231 |
| D631,633 | S | * | 1/2011 | Navarre, II | D34/28 |
| 7,862,093 | B2 | * | 1/2011 | Stiltner | 294/15 |
| 8,348,546 | B2 | * | 1/2013 | Welch et al. | 404/73 |
| 9,057,224 | B1 | * | 6/2015 | Cogburn, Jr. | |
| 2008/0072543 | A1 | * | 3/2008 | Watson et al. | 53/441 |

\* cited by examiner

*Primary Examiner* — Dean Kramer
(74) *Attorney, Agent, or Firm* — Mary M. Lee

(57) ABSTRACT

A method and device for moving racked tubulars, such as pipe and casing joints on pipe racks at oil and gas well sites. The pipe moving tool comprises a wheel assembly with a long straight handle. The wheels fit inside the pipe, which is then moved by simply pushing or pulling the handle forward or backward, as needed. Several wheel assemblies of different diameters may be used interchangeably with a single handle. An extension handle also may be included. The use of this tool makes moving the pipe safer as the worker's hands are not exposed to injury. Additionally, the handle on the tool makes it possible to easily and more safely reach and move shorter pipes racked above or below longer pipes in a multi-level pipe rack; it is not necessary for the worker to lean over or under the longer pipes.

34 Claims, 12 Drawing Sheets

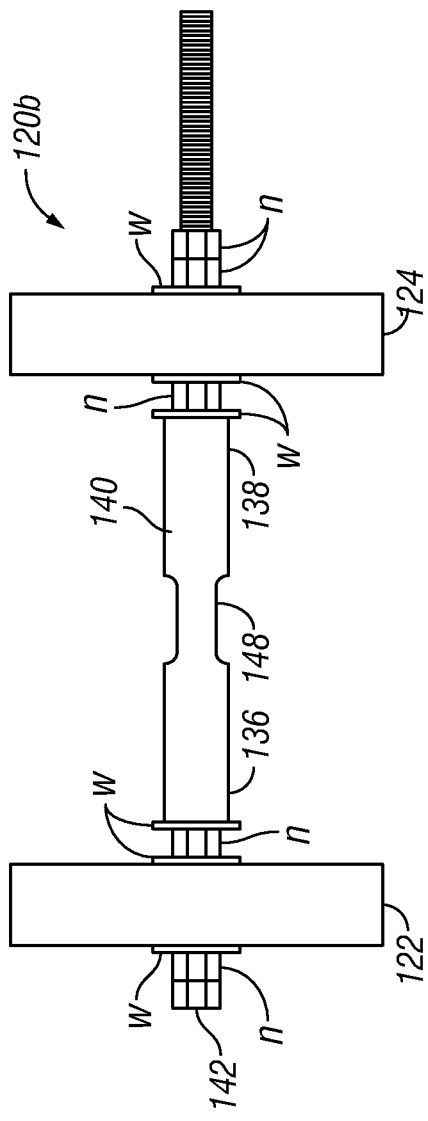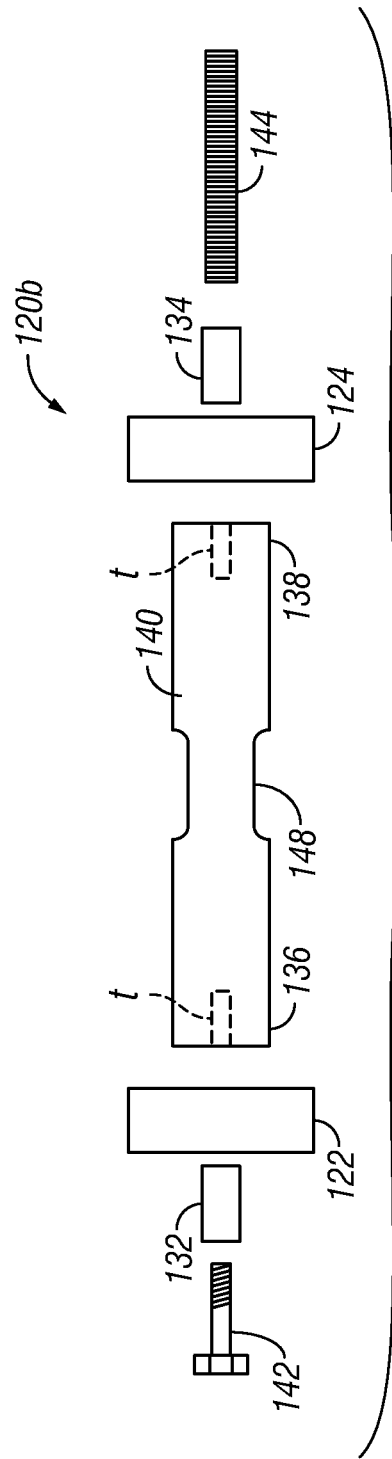

ial view of the wing member.
DEVICES AND METHODS FOR MANUALLY MOVING RACKED TUBULARS

CROSS-REFERENCE TO RELATED APPLICATIONS

This application is a continuation of application Ser. No. 14/602,806 entitled "Devices and Methods for Manually Moving Racked Tubulars," filed Jan. 22, 2015. The contents of this prior application are incorporated herein by reference.

FIELD OF THE INVENTION

The present invention generally relates to methods and devices for manually moving racked tubulars and, more particularly but without limitation, to moving racked tubulars at oil and gas wells.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate preferred embodiments of the invention and are not to be construed as limiting the scope of the invention.

FIG. 3 is an enlarged plan view of the wheel assembly of FIG. 2.

FIG. 4 is an exploded view of the wheel assembly of FIG. 2.

DETAILED DESCRIPTION OF THE PREFERRED EMBODIMENT(S)

Drill pipe and casing segments typically are racked up in one or more rows on pipe racks at the well site. Commonly, these tubulars are retrieved by hand. That is, one or more workers at the site simply stand behind the ends of the pipe and roll each pipe joint individually to the end of the rack using a hand-over-hand motion. At the end of the pipe rack the pipe joints are picked up and taken to the rig by other equipment. This direct manual manipulation of the pipe joints exposes the worker's hands to injury. In the case of multi-level racks, oilfield workers often are required to lean in over longer pipe in order to reach a shorter pipe. This can be hazardous to the worker and may result in inadvertent movement of pipes on a lower level of the rack.

The present invention provides a tool and method for moving racked tubulars at a well site. The tool comprises bearing-mounted wheels on the end of a long straight handle. The pipe is moved by inserting the wheel assembly in the end of the pipe and pushing the handle forward or backward. This eliminates the need for the worker's hands to directly contact the pipe. Also, the tool is operable from a standing position a distance to the side of the racked pipes. The long handle allows the worker to reach shorter pipes that may be racked above or below a row of longer pipes without having to lean over or under another row of longer pipes.

The tool allows one person to move pipes that might otherwise require two people with one on each end of the pipe. Moreover, even when two people are needed, such as for longer or heavier tubulars, the use of this inventive tool allows both workers to move the pipes faster and more safely than could be done by moving the pipe without the tool.

As used herein, "pipe" or "tubular" means any kind of cylindrical tubular member with an open center. This includes but is not limited to drill pipe, drill collars, casing joints, and casing collars. "Racked tubulars" means tubulars supported on a raised horizontal surface, such as a pipe rack, whether in a single row or in multiple rows with intervening slats. "Raised horizontal surface" means a surface that is supported a distance above and generally parallel to the ground or floor or whatever surface on which the workers are standing.

Figure 1:
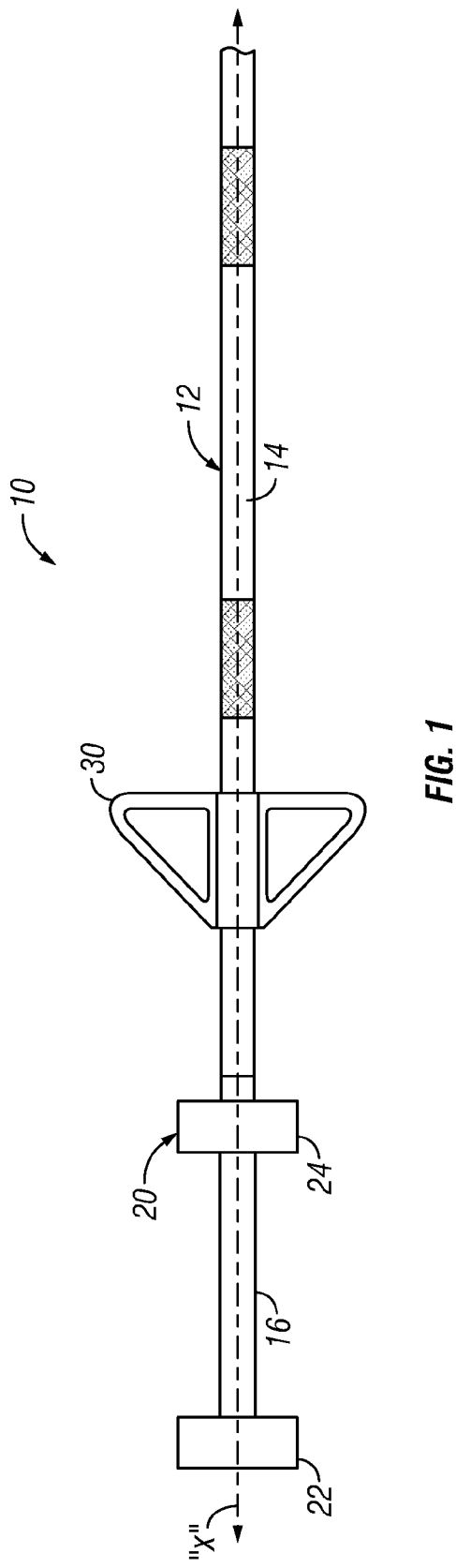
FIG. 1 is a plan view of a pipe rolling tool constructed in accordance with a preferred embodiment of the present invention.

Turning now to the drawings in general and to FIG. 1 in particular, there is shown therein a pipe rolling tool constructed in accordance with a preferred embodiment of the present invention and designated generally by the reference numeral 10. The tool 10 is ideal for manually moving one or more racked tubulars along a raised horizontal surface such as a pipe rack at a well site (not shown). As will become apparent, while this invention was designed for use in the oil field, there may be other applications where long tubulars are similarly racked and dispensed, and the tool and method of the present invention may be employed advantageously in these other applications as well.

As shown in FIG. 1, in one preferred construction, the tool 10 generally comprises a rigid shaft 12 with a handle section 14 and a wheel section 16. Each of the handle section 24 and the wheel section 16 has a longitudinal axis. Preferably these axes are parallel and most preferably these axes are collinear as is the axis "X" in FIG. 1. In this embodiment, the handle section 14 and the wheel section 16 of the shaft 12 are integrally formed of a single elongate member. While the shaft may be a solid rod or a tubular shaft, a solid rod is preferred.

A wheel assembly 20 is mounted for rotation about the longitudinal axis X of the wheel section 16 of the shaft 12. While the wheel assembly 20 may have only one wheel, or several wheels, in this preferred embodiment, the wheel assembly 20 has two wheels 22 and 24. The wheels 22 and 24 are sized to be received inside the inner diameter of the racked tubular through the open end.

Still further, the tool 10 may include a stop, designated at 30. The stop 30 is positioned on the shaft 12 proximal to the wheel assembly 20 and sized to engage the open end of the racked tubular so that advancement of the tool 10 into the inner diameter of the racked tubular past the stop is prevented. A preferred construction for the stop 30 is explained in detail below.

Figure 2:
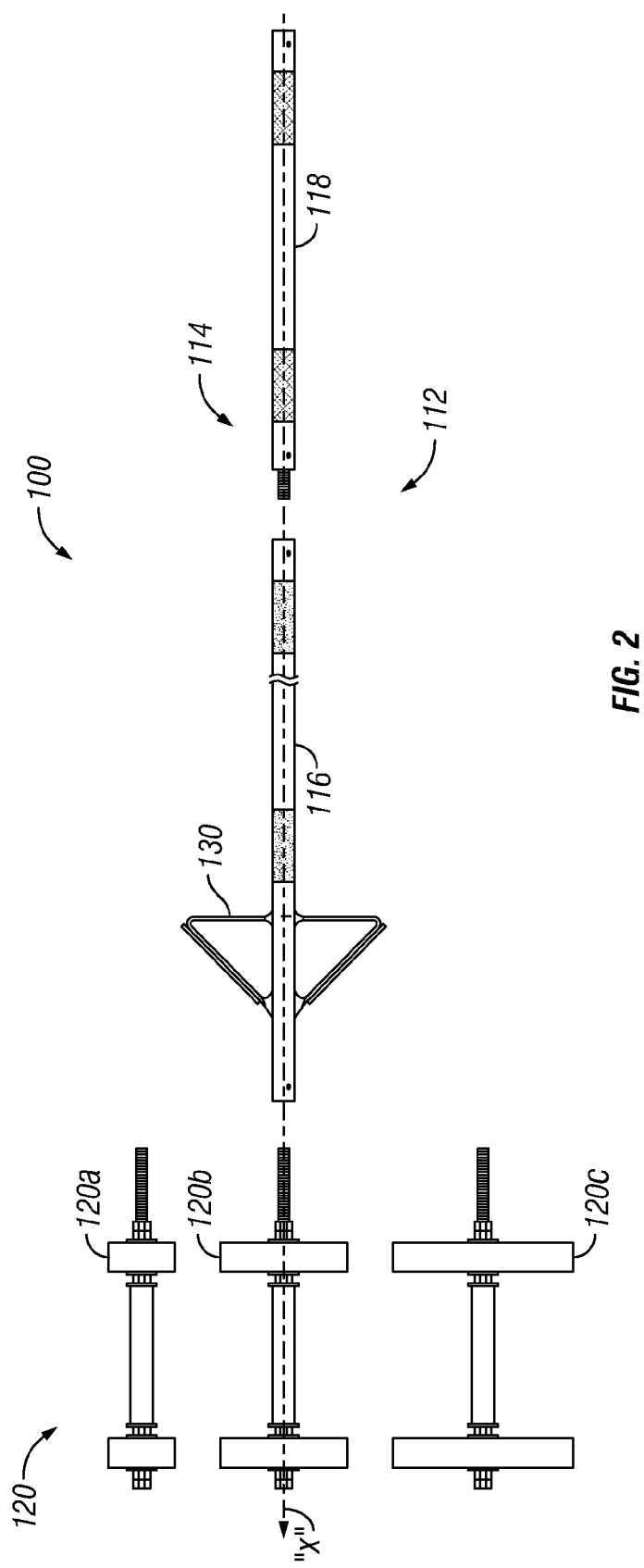
FIG. 2 is an exploded view of a pipe rolling tool made according to a second preferred embodiment in which the shaft is segmented and includes three interchangeable wheel assemblies of different sizes.

Turning to FIG. 2, another embodiment of the inventive tool is shown and identified generally by the reference number 100. The tool 100 comprises a shaft 112 with a two-part handle section 114 comprising a main handle 116 and an extension handle 118, as explained in more detail hereafter. Also included is a wheel section 120. Additionally, the tool 100 may include a plurality of wheel assemblies 120a, 120b, and 120c, which have wheels of different diameters. Each of the wheel assemblies is sized to be received inside a different size of tubular. Preferably, the diameter of the wheels is an inch or so less than the internal diameter of the tubular to be moved. For example, in the tool 100 the three wheel assemblies include one (120a) with 4.5 inch wheels, one (120b) with 8.5 inch wheels, and one (120c) with 12 inch wheels. This allows the tool 10 to work with most sizes of tubulars commonly used at a well site by simply interchanging the wheel assemblies.

The main handle 116, extension handle 118, and one of the plurality of wheel assemblies 120 are interconnectable, as explained further hereafter. A similar stop 130 also is included.

Referring still to FIG. 2, each of the wheel assemblies 120a, 120b, and 120c includes one or more wheels and most preferably includes a pair of spaced apart wheels, as in the previous embodiment, such as the wheels 122 and 124 of the wheel assembly 120b. The wheels 122 and 124 are mounted for rotation about the longitudinal axis "X" that is generally coaxial with that of the tubular (not shown) to be moved. As indicated, the longitudinal axis of the wheel assembly 120, the main handle 116 and the extension handle 118 all are collinear with each other, or at least parallel.

With reference now to FIGS. 3-9, an exemplary construction for the wheel assembly 120 shown in FIG. 2 will be described. As the wheel assemblies 120a, 120b, and 120c, are similarly constructed, only the wheel assembly 120b will be shown and described in detail. The wheels 122 and 124 are mounted on bearings 132 and 134 (FIG. 4 only) on the first end 136 and second end 138 of a wheel shaft 140. As seen FIGS. 4 and 9, the wheel shaft 140 may be a solid cylindrical rod with a box thread "t" tapped into each end. While the dimensions may vary, in a preferred form the wheel shaft 140 is about 9.5 inches long and about 1.5 inches in diameter.

On the first end 136 of the wheel shaft 140, the wheel 122 is mounted on the bearing 132 which is supported on a hex bolt 142 that is threadedly attached to the box thread "t." On the second end 138 of the assembly 120b, the wheel 124 is supported on the bearing 134 that is mounted on an all-thread rod 144, one end of which is threadedly attached to box thread "t" of the wheel shaft 140. The exposed end of the all thread rod 144 is used to removably connect the wheel assembly 120b to the first or distal end of the main handle 112.

Hex nuts, all designated at "n" and seen only in FIG. 3, are included on both sides of each wheel 122 and 124. Washers, all designated "w" and seen only in FIG. 3, may be included on both sides of the wheels 122 and 124 and at each end of the wheel shaft 140. The wheel shaft 140 may have wrench flats 148.

Figure 6:
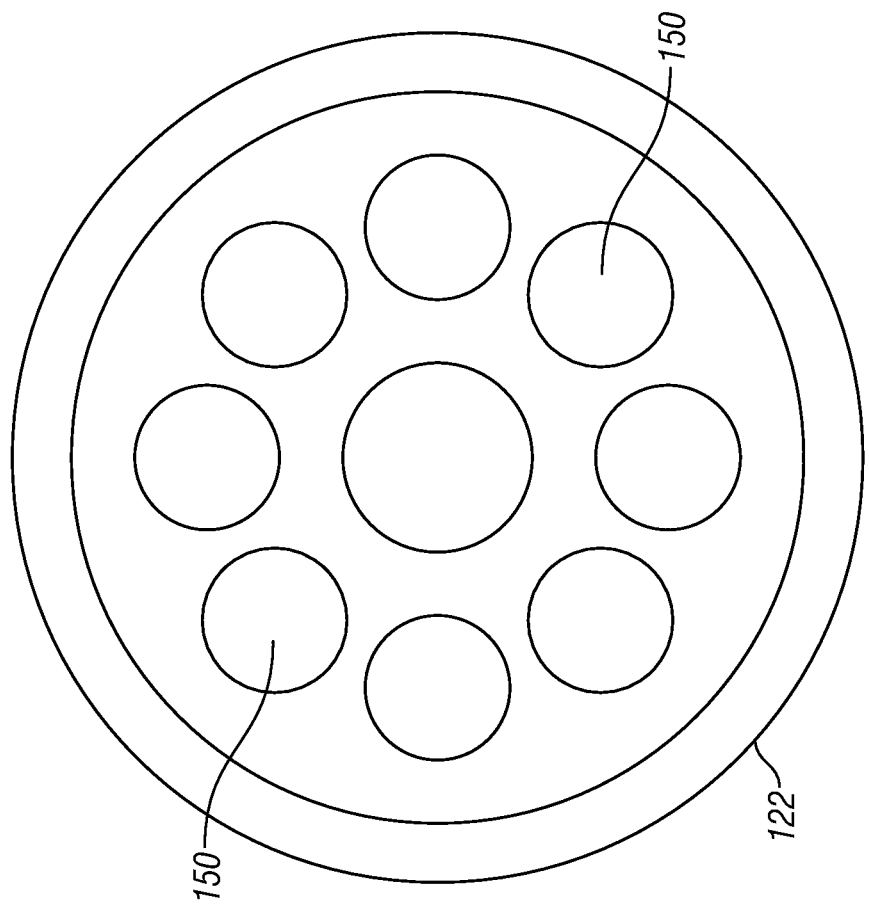
FIG. 6 is a side elevational view of the preferred wheel.
Figure 5:
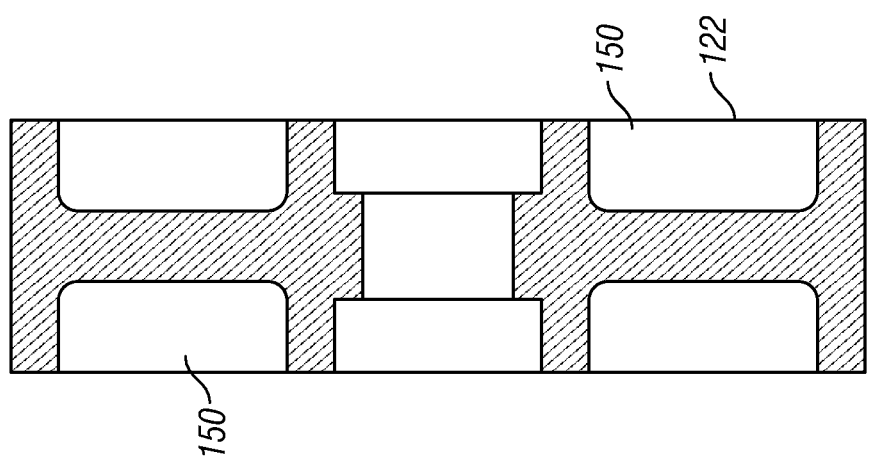
FIG. 5 is a cross-section view of a preferred wheel.

An illustrative form for the wheels is illustrated in FIGS. 5 and 6. While only the wheel 122 is shown, it will be understood that both wheels may be identically formed. To reduce the weight, the wheels may have cut-outs designated collectively at 150. Additionally, a tire or rubber rim (not shown) may be included to increase frictional engagement with the inner diameter of the pipe and to reduce noise.

Figure 8:
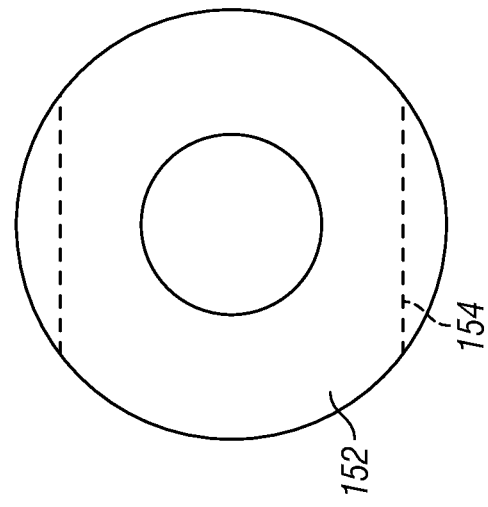
FIG. 8 is an end view of the nut. The wrench flats in the side wall of the nut are shown in phantom.
Figure 7:
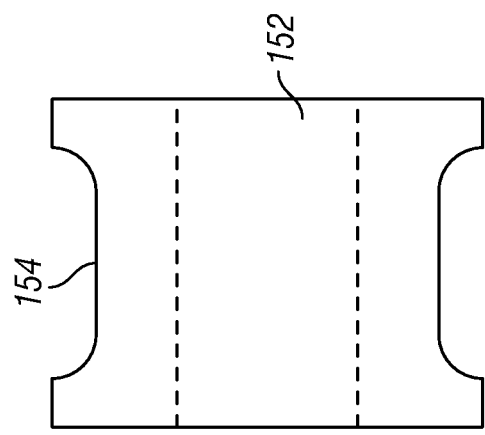
FIG. 7 is a side elevational view of a nut used in the wheel assembly of FIG. 2. The through bore is shown in phantom.
Figure 9:
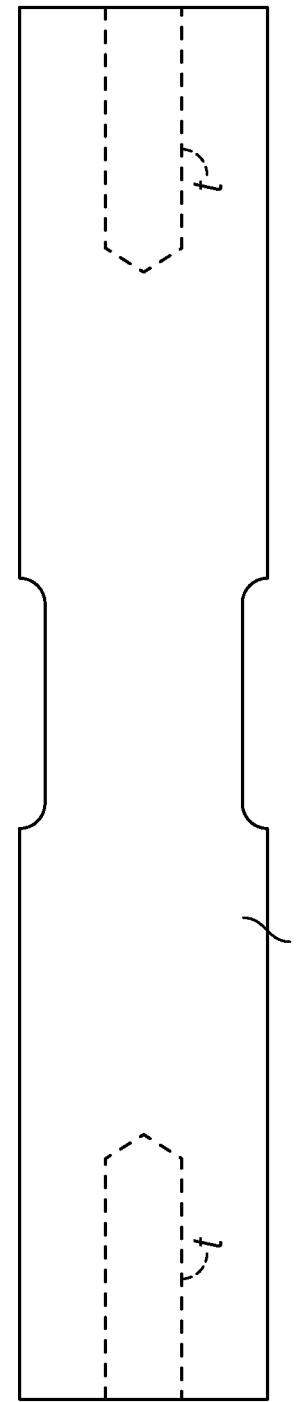
FIG. 9 is a side elevational view of the wheel spacer or separator used in the wheel assembly of FIG. 2. The box threaded tap in each end is illustrated in phantom.

Of course, various modifications of this structure are possible and all are within the scope of the invention. For example, instead of the hex nut 142, the bearing 132, and wheel 122 may be mounted on an all thread rod and then capped with a second hex nut, similar to that on the second end of the assembly. Also, instead of a pair of hex nuts "n," as seen in FIG. 3, a single spacer nut 152, as seen in FIGS. 7 and 8, may be used on the first end of the assembly 120. The spacer nut 152 may include wrench flats 154.

Turning now to FIGS. 10-20, a preferred construction for the main handle 116 will be shown and described. As best seen FIGS. 11-13, the main handle 116 comprises an elongate tubular body 160. While dimensions may vary, the body 160 may be about 42 inches long with an outer diameter of about 1.5 inches and inner diameter of about 1.41 inches. Each of the first and second ends 162 and 164 of the main handle 116 is provided with a box thread. While this may be accomplished in various ways, one suitable way is to include a two-inch box threaded insert 166 and 168 (FIGS. 13 & 14) inside each end 162 and 164. The inserts 166 and 168 are secured in position by welds 170 made through holes 172 in the ends 162 and 164 of the body 160.

The inner diameter of the box thread is sized to receive the all thread rod 144 of the wheel assembly 120b (FIGS. 3 & 4); this provides the removable connection between the wheel assembly 120 and the main handle 116. To enhance the grippability of the handle, it may be provided with one or more diamond knurled sections, all designated at 178, as shown in FIGS. 10 and 11.

As indicated, in the preferred embodiments of the tool 10 and 100, a stop 30 and 130 is provided to engage the open end of the racked tubular so that advancement of the tool further into the inner diameter of the racked tubular past the stop is prevented. While the structure of the stop may vary widely, a particularly advantageous design is shown in FIGS. 15-20, to which attention now is directed. The stop, illustrated by the stop 130, defines an elongate surface at a non-normal angle relative to the longitudinal axis of the main handle 116. For example, an angled surface formed by one or more slanted structures or one continuous conical structure would be sufficient. The stop 130 is positioned on the shaft 112 proximal to the wheel assembly 120. Most preferably, the stop 130 is positioned on the distal end of the main handle section 116 as shown.

Figure 10:
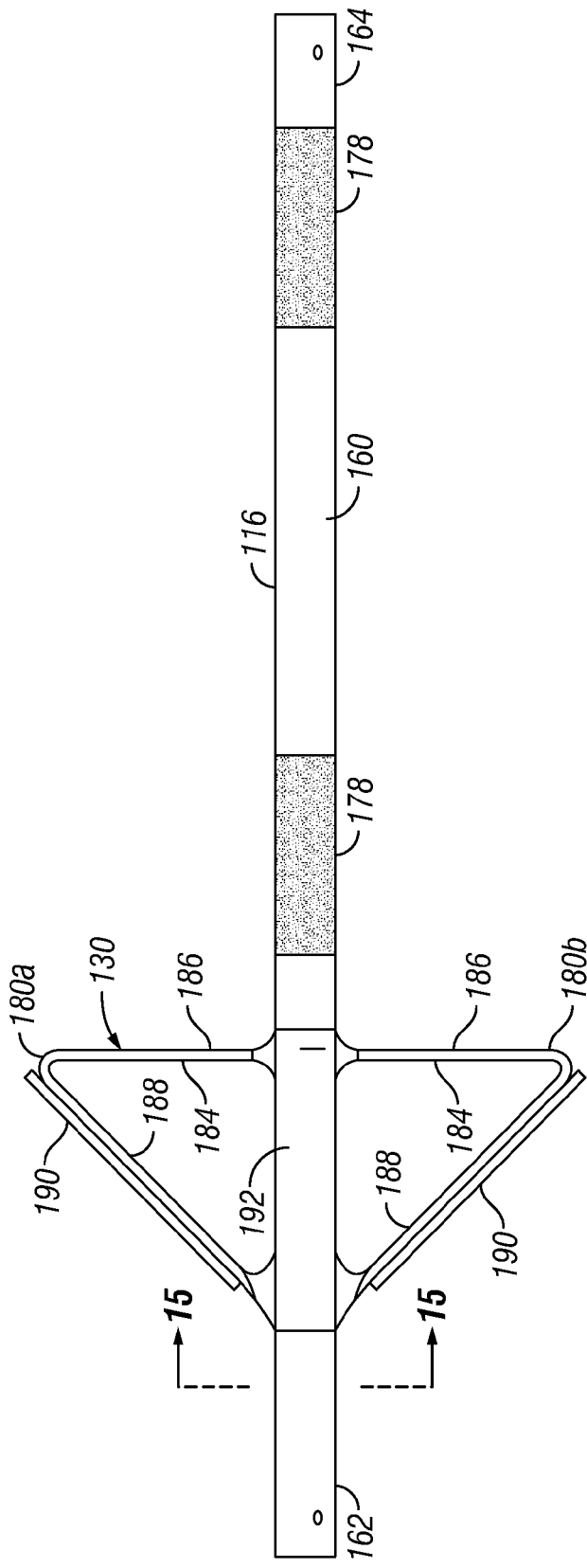
FIG. 10 is an enlarged, fragmented elevational view of the main handle assembly forming a part of the pipe rolling tool shown in FIG. 2.
Figure 11:
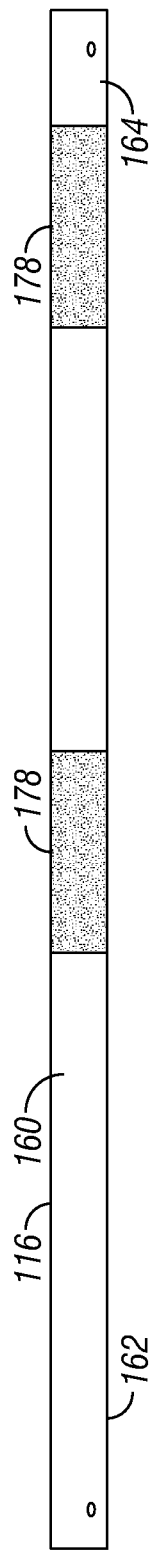
FIG. 11 is an enlarged, fragmented view of the main handle with the pipe stop removed.
Figure 12:
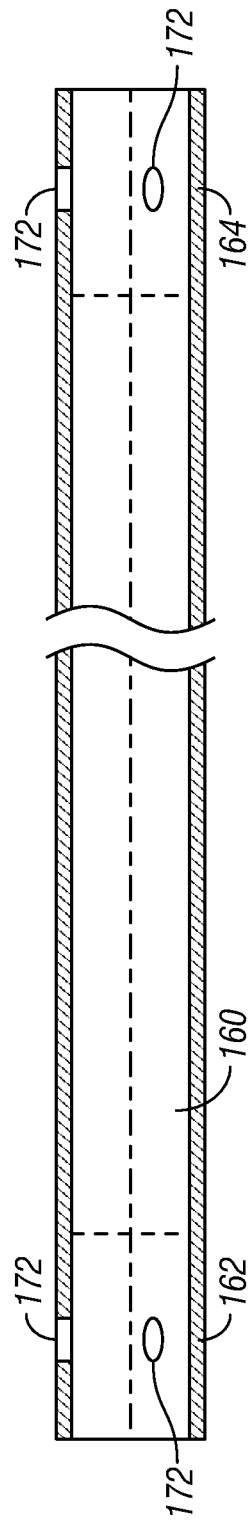
FIG. 12 is an enlarged, fragmented longitudinal sectional view of the main handle.
Figure 13:
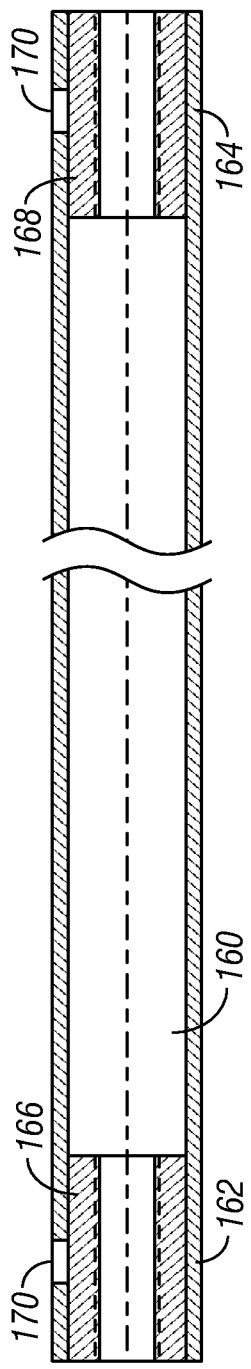
FIG. 13 is an enlarged, fragmented longitudinal sectional view of the main handle shown with the box thread inserts in each end.
Figure 14:
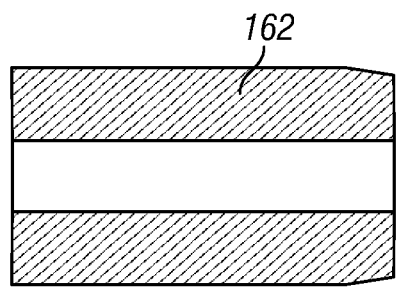
FIG. 14 is an enlarged, longitudinal sectional view of the bushings from the main handle shown in FIG. 13.
Figure 15:
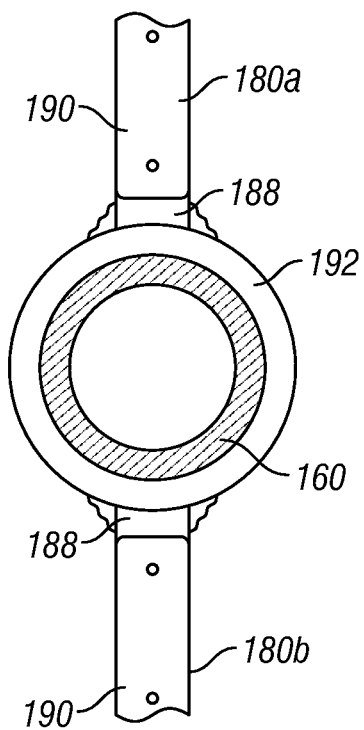
FIG. 15 is an enlarged, fragmented cross-sectional view taken along the line 15-15 in FIG. 10.
Figure 16:
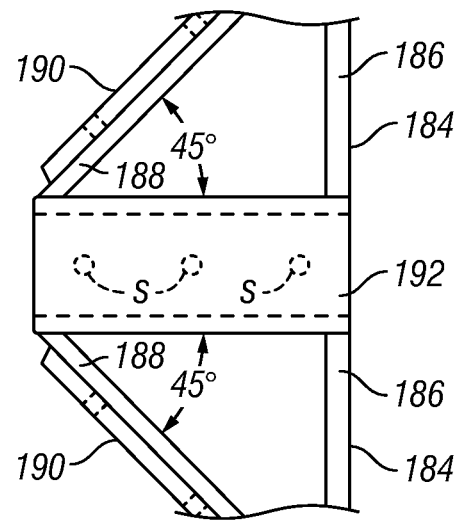
FIG. 16 is an enlarged, fragmented side elevational view of the pipe stop. The through bore of the sleeve is shown in phantom.
Figure 20:
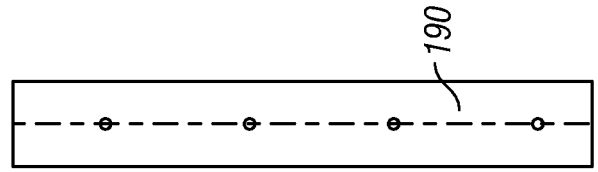
FIG. 20 is a front elevational view of the reinforcement bar of the pipe stop.
Figure 19:
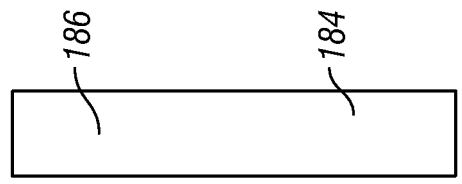
FIG. 19 is a rear elevational view of the wing member.
Figure 18:
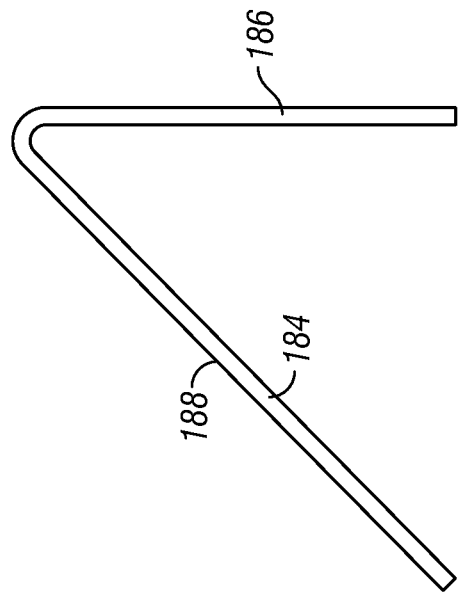
FIG. 18 is a side elevational view of the wing member.
Figure 17:
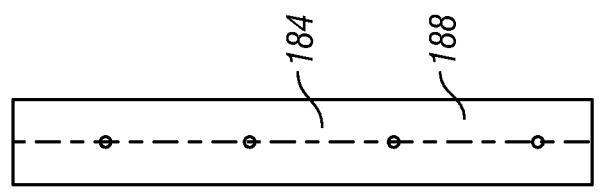
FIG. 17 is a front elevational view of the angled wing member of the pipe stop.

The preferred stop 130 takes the form of a plurality of wings, such as the two wings 180a and 180b shown in FIG. 10. Again, various structures may serve this purpose, but one preferred form is a metal strip 184 bent to form a triangle with the handle 116. The bent strip 184 then has a shorter leg 186 extending perpendicular to the handle 116 and a longer leg 188 at a forty-five degree (45°) angle, as seen in FIGS. 10 and 16. A reinforcing bar 190 (FIGS. 10, 15, 16, and 20) may be attached to the front of the longer leg 188. The attachment may be by pop rivets or any other suitable means.

The two wings 180a and 180b are attached to the tool 10 a distance from the wheel assembly 20. Preferably, the wings 180a and 180b are attached to the body 160 of the main handle 116. This may be done in several ways. They may be bolted or welded directly to the body 160. Or, more preferably, the wings 180a and 180b are welded to a sleeve 192 (FIGS. 10, 15, & 16) that is then secured to the body 160 of the main handle 116 using set screws "s" (FIG. 16). This is particularly advantageous as it permits the axial position of the stop 130 on the handle 116 to be adjusted.

Figure 21:
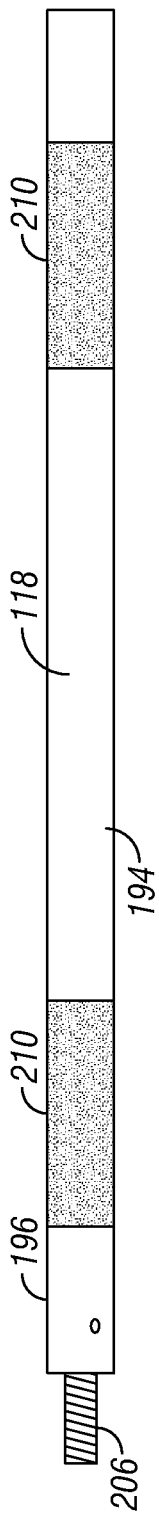
FIG. 21 is a side elevational view of the extension handle of the pipe rolling tool in FIG. 1.
Figure 22:
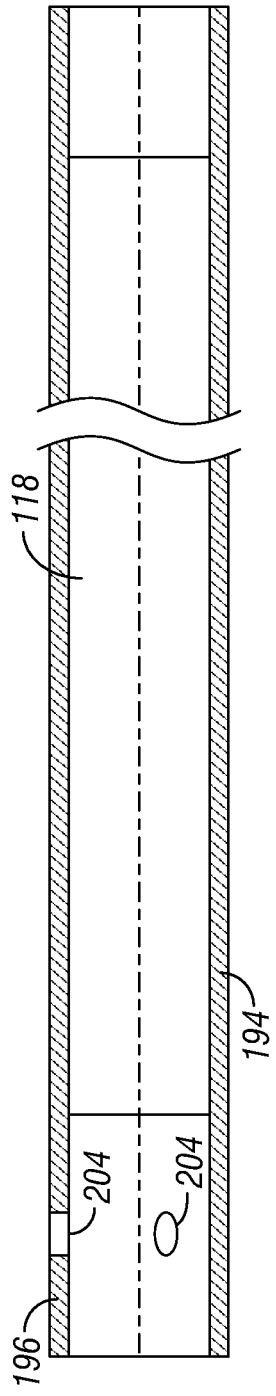
FIG. 22 is an enlarged, fragmented longitudinal view of the extension handle with the all thread rod removed.
Figure 23:
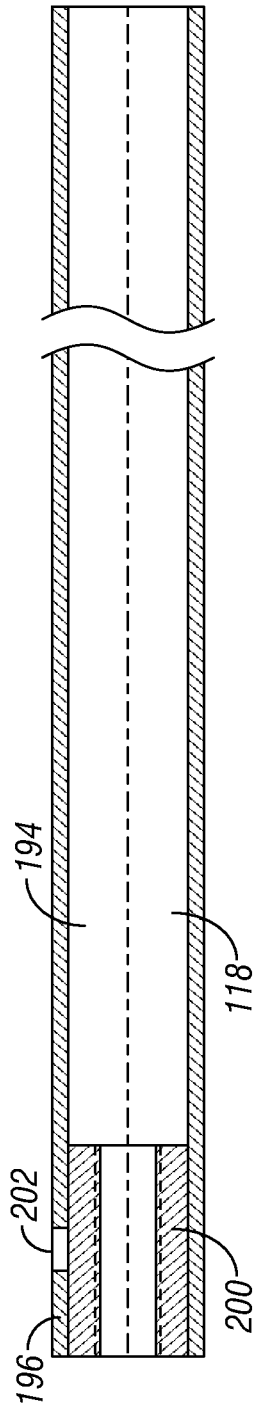
FIG. 23 is an enlarged, fragmented longitudinal sectional view of the extension handle with the box threaded insert installed in one end.

With reference now to FIGS. 21-23, a preferred structure for the extension handle 118 will be explained. As shown, the extension handle 118 comprises an elongate tubular body 194. While dimensions may vary, the body 194 may be about 30 inches long with an outer diameter of about 1.5 inches and inner diameter of about 1.41 inches. The handle body 194 has a first or distal end 196 that is provided with a box thread. While this may be accomplished in various ways, one suitable way is to include a two-inch box threaded insert 200 (FIG. 23) inside the end 196. The insert 200 is similar to the inserts 166 and 168 of the main handle 116 and likewise may be secured in position by welds 202 made through holes 204 in the first end 196.

The inner diameter of the box thread of the insert 200 is sized to receive an all thread rod 206 (FIG. 21). Using this all thread rod 206, the extension handle 118 may be removably attached to the proximal end 164 of the main handle 116. To enhance the grippability of the extension handle 118, the body 194 may be provided with one or more diamond knurled sections, all designated at 210, as shown in FIG. 21.

Figure 24:
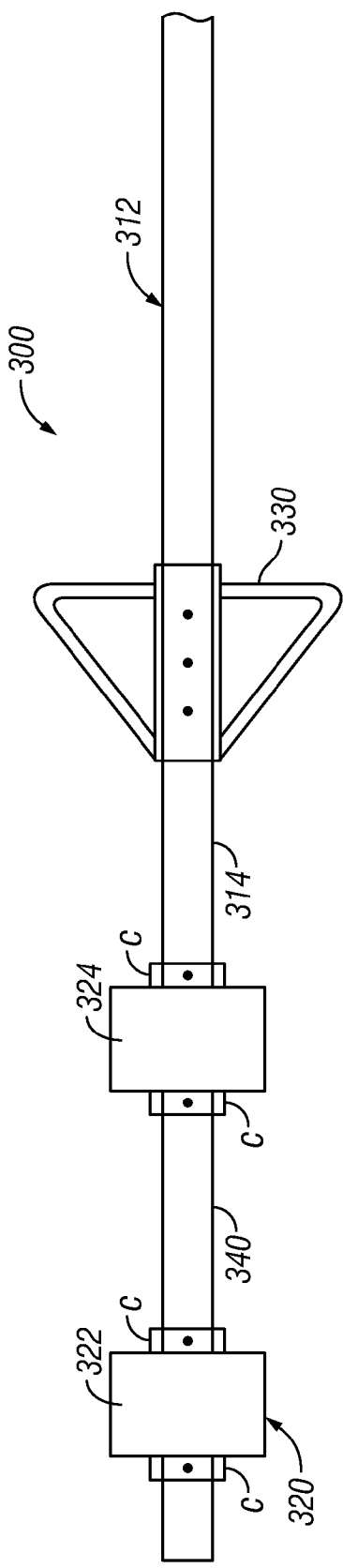
FIG. 24 is a side elevational view of another preferred embodiment of the inventive pipe rolling tool.

Yet another embodiment of the pipe rolling tool is shown in FIG. 24 and designated generally by the reference number 300. Like the previous embodiment, the tool 300 comprises a shaft 312 that includes a handle section 314 and supports a wheel assembly 320 with wheels 322 and 324. A similar triangular or wing-shaped stop 330 is also included. In this embodiment, the shaft 312 is integrally formed and comprises a wheel section 340 that supports the wheel assembly 320 and the handle section 314. The shaft 312 may be a length of solid rod, such as 1-inch aluminum rod. The wheels 322 and 324 and bearings (not shown for this embodiment) are formed as previously described except that they are made for a 1-inch shaft. Each of the wheels 322 and 324 can be positioned on the shaft 312 as desired and then secured in that position with a pair of 1-inch set collars, each of which is designated by the letter "C." Now it will be appreciated that in this simplified version of the tool, the wheels 322 and 324 and the stop 330 all are slidably positionable on the shaft 312 relative to each other to adapt to the size and length of the tubular to be moved.

While the above describes particularly preferred embodiments of the inventive tool, many variations are possible that would be encompassed by the present invention. For example, the overall length of the handle may vary from 2 to 12 feet, preferably from about 3.5 to about 8 feet. In the embodiment of FIG. 24, with solid shaft 312, the overall length of the shaft may be 4.5 feet. The diameter of the handle is selected to be comfortably gripped by the workmen. To that end, the diameter of the handle may be less than about five inches, and more preferably less than about three inches, and most preferably about 1-inch to about 1.5 inches. The handle components may be made from any of several materials, such as steel and aluminum, and may be formed from a solid rod or tubular, as shown and described. The handle may be formed from tubular aluminum, as this reduces cost and weight, or from a solid aluminum rod, as this is stronger and provides a simpler overall construction for the tool. The handle may be circular in cross-section as shown, but other configurations may also be employed. The handle may be integrally formed with the shaft of the wheel assembly, as in FIGS. 1 and 24, or composed of interconnectable segments, as in the embodiments of FIGS. 2-23.

Figure 25:
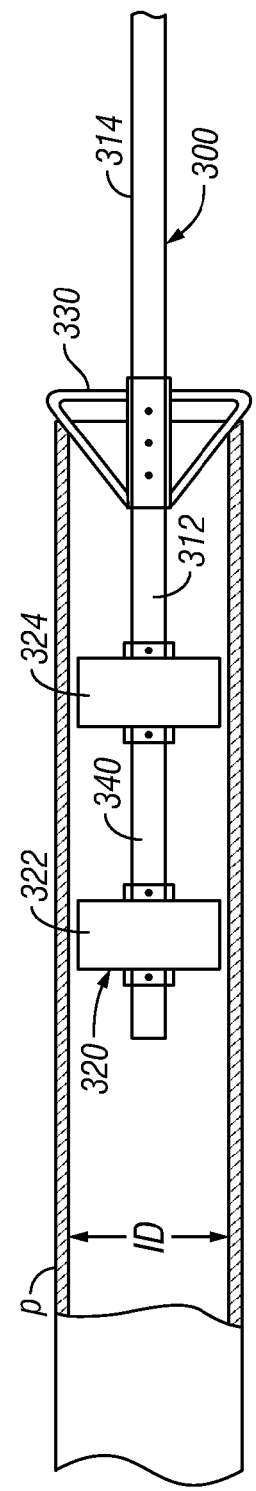
FIG. 25 is a fragmented view of the pipe rolling tool of FIG. 24 inserted in the end of a pipe shown in section to illustrate the operational position of the tool.
Figure 26:
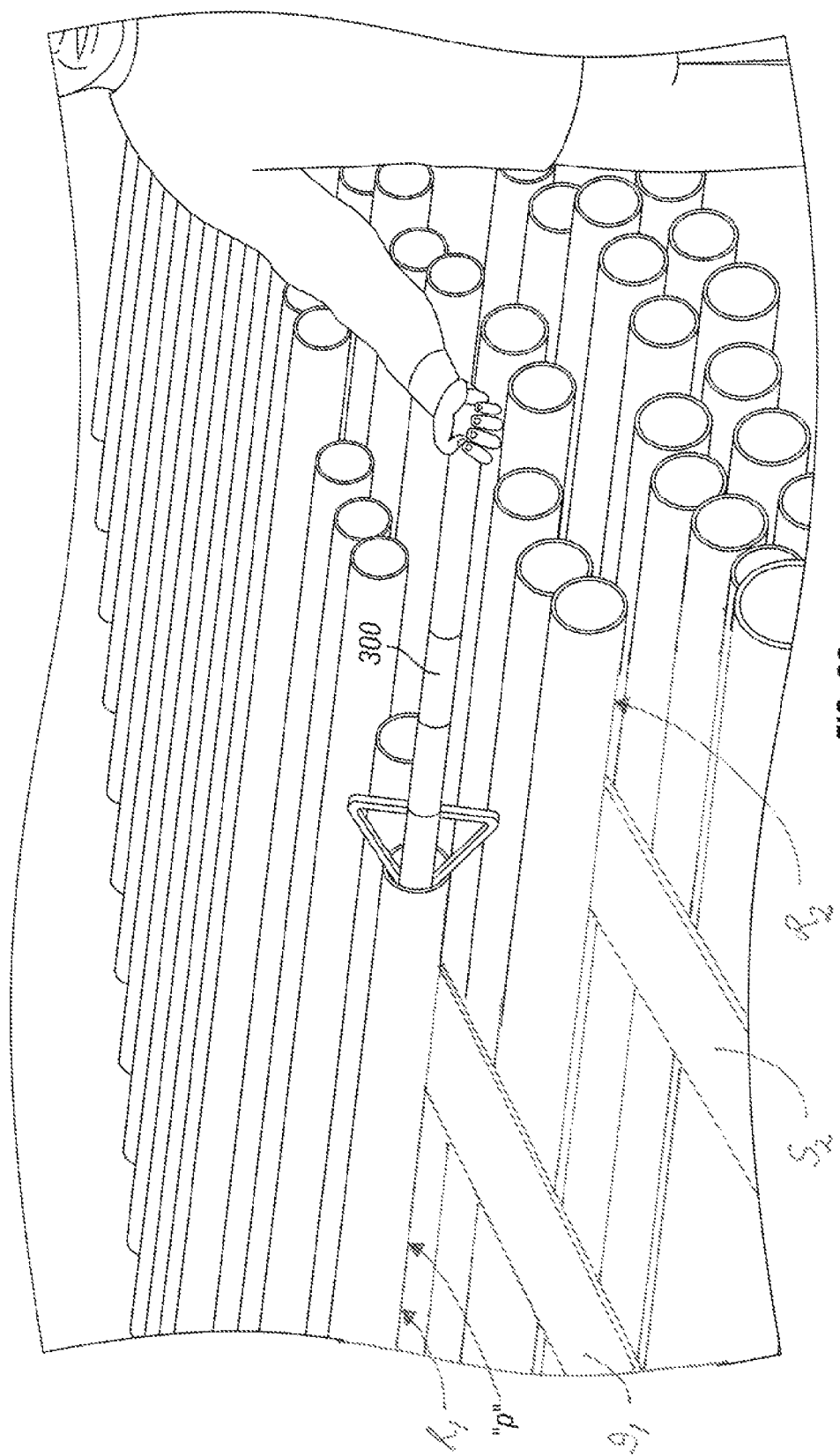
FIG. 26 is a schematic illustration of an oil field worker using the inventive pipe rolling tool to move one of a number of pipe joints stacked in layers or tiers.

Referring now to FIGS. 25 and 26, the use of the above-described tool and the method of the present invention will be explained. FIG. 25 illustrates how the inventive tool 300 (or 10 or 100) is positioned relative to tubular member or pipe "P." The wheel assembly 320 is positioned inside the pipe P. Note that there is a small space between the wheels 322 and 324 and the inner surface of the pipe P. In most cases, the outer diameter of the wheels 320 and 324 (or 22 and 24 or 122 and 124) will be slightly less than the inner diameter "ID" of the pipe. The tool 300 is advanced until the stop 330 is adjacent to the open end of the pipe. Then, the user manually pushes or pulls the handle 314 forward or backward as indicated. As used herein, "manually" means that the action is being carried out by a human worker directly manipulating the tool handle with his or her hands and not by using a machine. Although not shown in FIGS. 25 and 26, it is to be understood that in some instances, a second person using a second tool may be doing the same operation on the opposite end of the pipe.

The pipe is rolled to the end of the pipe rack or other raised horizontal surface and then the tool is withdrawn and inserted into the next pipe or tubular. The second pipe may be on the same level as the first pipe. Alternately, the second pipe may be on a second rack or surface above or below the first one, illustrated in FIG. 26, which shows a pipe rack with multiple levels or rows of pipe. Typically, as described above, each row of pipe is laid across one or more slats, each layer of slats forming a pipe rolling surface. As shown in FIG. 26, a first row of pipe designated generally at $R_1$ is supported on a slat, which forms a first raised horizontal surface $S_1$, and the second row of pipe $R_2$ is supported on a slat, forming a second raised horizontal surface $S_2$ that is parallel to the first raised surface.

Now it will be appreciated that the tool and method of the present invention greatly facilitates the manual movement of racked tubulars on a pipe rack or other raised horizontal surface at an oil well site. The tool makes the pipe rolling process faster and safer for the workers. This is accomplished with small, lightweight simply designed tool that is easy to manufacture and to use. Adding multiple interchangeable wheel assemblies in a range of sizes permits the tool to be used with a range of pipe sizes, making the tool versatile and adaptable.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. A tool for manually moving a racked tubular along a raised horizontal surface, wherein the racked tubular has an open end continuous with an inner diameter, the tool comprising:
   a shaft having a handle section with a longitudinal axis and a wheel section with a longitudinal axis, wherein the longitudinal axes of the handle section and the wheel section are parallel; and
   a wheel assembly mounted for rotation about the longitudinal axis of the wheel section of the shaft, wherein the wheel assembly is sized to be received inside the racked tubular, wherein the wheel assembly comprises two wheels, and wherein each of the two wheels in the wheel assembly is adjustably mounted so that the axial position of the wheel on the shaft is changeable.

2. The tool of claim 1 wherein the handle section and the wheel section of the shaft are integrally formed of a single elongate member.

3. The tool of claim 2 wherein the longitudinal axes of the handle section and the wheel section are collinear.

4. The tool of claim 2 wherein the tool further comprising a stop positioned on the shaft proximal to the wheel assembly and sized to engage the open end of the racked tubular so that advancement of the tool into the inner diameter of the racked tubular past the stop is prevented.

5. The tool of claim 4 wherein the position of the stop on the shaft is axially adjustable.

6. The tool of claim 5 wherein the stop defines an elongate surface at a non-normal angle relative to the longitudinal axis of the handle section of the shaft.

7. The tool of claim 6 wherein the stop comprises a plurality of laterally extending wings.

8. The tool of claim 1 wherein the wheel assembly is one of a plurality of interchangeable wheel assemblies.

9. The tool of claim 8 wherein each of the plurality of interchangeable wheel assemblies comprises a set of two wheels and wherein the diameter of the wheels in each of the plurality of wheel assemblies is different from the wheels in the other wheel assemblies.

10. The tool of claim 9 wherein each of the set of two wheels in each of the plurality of wheel assemblies is adjustably mounted so that the axial position of the wheel on the shaft is changeable.

11. The tool of claim 10 wherein the handle section and the wheel section of the shaft are integrally formed of a single elongate member.

12. The tool of claim 11 wherein the longitudinal axes of the handle section and the wheel section are collinear.

13. The tool of claim 1 wherein the wheel section of the shaft is removably connectable to the handle section of the shaft.

14. The tool of claim 13 wherein the handle section of the shaft comprises a main handle having a first end and a second end and an extension handle having a first end and a second end, the first end of the extension handle being removably attachable to the second end of the main handle and wherein the longitudinal axis of the extension handle and the longitudinal axis of the main handle are both parallel with the longitudinal axis of the wheel section of the shaft.

15. The tool of claim 1 wherein the tool further comprising a stop positioned on the shaft proximal to the wheel assembly and sized to engage the open end of the racked tubular so that advancement of the tool into the inner diameter of the racked tubular past the stop is prevented.

16. The tool of claim 15 wherein the position of the stop on the shaft is axially adjustable.

17. A tool for manually moving a racked tubular along a raised horizontal surface, wherein the racked tubular has an open end continuous with an inner diameter, the tool comprising:
   a shaft having a handle section with a longitudinal axis and a wheel section with a longitudinal axis, wherein the longitudinal axes of the handle section and the wheel section are parallel;
   a wheel assembly mounted for unrestricted rotation about the longitudinal axis of the wheel section of the shaft, wherein the wheel assembly is sized to be received inside the racked tubular; and
   wherein the handle section of the shaft comprises a main handle having a first end and a second end and an extension handle having a first end and a second end, the first end of the extension handle being removably attachable to the second end of the main handle and wherein the longitudinal axis of the extension handle and the longitudinal axis of the main handle are both parallel with the longitudinal axis of the wheel section of the shaft.

18. The tool of claim 17 wherein the wheel assembly comprises two wheels.

19. The tool of claim 18 wherein each of the two wheels in the wheel assembly is adjustably mounted so that the axial position of the wheel on the shaft is changeable.

20. The tool of claim 19 wherein the handle section and the wheel section of the shaft are integrally formed of a single elongate member.

21. The tool of claim 20 wherein the longitudinal axes of the handle section and the wheel section are collinear.

22. The tool of claim 19 wherein the tool further comprising a stop positioned on the shaft proximal to the wheel assembly and sized to engage the open end of the racked tubular so that advancement of the tool into the inner diameter of the racked tubular past the stop is prevented.

23. The tool of claim 22 wherein the position of the stop on the shaft is axially adjustable.

24. The tool of claim 23 wherein the stop defines an elongate surface at a non-normal angle relative to the longitudinal axis of the handle section of the shaft.

25. The tool of claim 24 wherein the stop comprises a plurality of laterally extending wings.

26. The tool of claim 17 wherein the wheel assembly is one of a plurality of interchangeable wheel assemblies.

27. The tool of claim 26 wherein each of the plurality of interchangeable wheel assemblies comprises a set of two wheels and wherein the diameter of the wheels in each of the plurality of wheel assemblies is different from the wheels in the other wheel assemblies.

28. The tool of claim 27 wherein each of the set of two wheels in each of the plurality of wheel assemblies is adjustably mounted so that the axial position of the wheel on the shaft is changeable.

29. The tool of claim 17 wherein the handle section and the wheel section of the shaft are integrally formed of a single elongate member.

30. The tool of claim 17 wherein the longitudinal axes of the handle section and the wheel section are collinear.

31. The tool of claim 17 wherein the wheel section of the shaft is removably connectable to the handle section of the shaft.

32. The tool of claim 17 wherein the tool further comprises a stop positioned on the shaft proximal to the wheel assembly and sized to engage the open end of the racked tubular so that advancement of the tool into the inner diameter of the racked tubular past the stop is prevented.

33. The tool of claim 32 wherein the position of the stop on the shaft is axially adjustable.

34. The tool of claim 33 wherein the wheel assembly comprises two wheels and wherein each of the wheels is adjustably mounted so that the axial position of the wheel on the shaft is changeable.

* * * * *